United States Patent [19]

King

[11] Patent Number: 5,266,347
[45] Date of Patent: Nov. 30, 1993

[54] ANTIBIOTIC BIOMASS ANIMAL FEED COMPOSITIONS

[75] Inventor: Bruce D. King, Troy, Ill.

[73] Assignee: DuCoa L.P., Highland, Ill.

[21] Appl. No.: 827,198

[22] Filed: Jan. 28, 1992

[51] Int. Cl.$^5$ ................................................ A23K 1/00
[52] U.S. Cl. ...................... 426/623; 426/60; 426/805; 426/807
[58] Field of Search .............. 426/623, 635, 60, 805, 426/807; 514/31; 424/119; 435/267

[56] References Cited

U.S. PATENT DOCUMENTS

| | | | |
|---|---|---|---|
| 3,655,396 | 4/1972 | Goto et al. | 426/60 |
| 3,802,998 | 4/1974 | Tsyganov et al. | 195/80 R |
| 4,132,777 | 1/1979 | Van Os et al. | 424/119 |
| 4,291,053 | 9/1981 | Dost et al. | 424/283 |
| 4,395,491 | 7/1983 | Hohl et al. | 435/267 |
| 4,536,494 | 8/1985 | Carter | 514/31 |
| 4,600,706 | 7/1986 | Carter | 514/31 |
| 4,748,117 | 5/1988 | Ko et al. | 514/31 |
| 4,770,876 | 9/1988 | Bischoff et al. | 424/119 |
| 4,950,477 | 8/1990 | Schmitt et al. | 424/119 |

FOREIGN PATENT DOCUMENTS 1254212   11/1971   United Kingdom .
2106498A   4/1983   United Kingdom .

*Primary Examiner*—R. B. Penland

[57] ABSTRACT

An animal feed which is improved by the addition of a nonviable antibiotic biomass. The biomass may be obtained by drying a fermented biomass of an organism capable of producing an antibiotic which is effective against mycotoxin contamination. The resultant animal feed is substantially free of fungal mycotoxin contamination.

9 Claims, No Drawings

ANTIBIOTIC BIOMASS ANIMAL FEED COMPOSITIONS

BACKGROUND OF THE INVENTION

1. Field of the Invention

The present invention relates to animal feed compositions enhanced with certain antibiotic biomass and processes for preparing the same. More specifically, the invention relates to an animal feed admixed with an antibiotic-containing biomass derived from the fermentation of amphotericin A or B, virginiamycin, leucomycins, levorin, filimarisin, partricin or trichomycin

2. Description of the Related Art

Polyene antibiotics have been produced in purified form and are known, in this form, to be effective antibiotic agents for a number of uses in post-formed formulations such as aqueous suspensions.

Natamycin, an effective antifungal agent, has been disclosed as an animal feed supplement to enhance growth (see U.S. Pat. No. 4,536,494). In this feed supplement, dry crystalline natamycin in effective amounts is physically mixed with feed grain or the like.

U.S. Pat. No. 4,132,777 discloses aqueous suspensions of natamycin formulated as an aqueous suspension for use on animals to control diseases such as ringworm.

Similarly, U.S. Pat. No. 4,950,477 discloses aqueous aerosol suspensions of pure polyenes including pimaricin for control of various fungal diseases in humans and animals.

Canadian Patent 684,259 discloses feed additives of *Candida albicans* fermentation product, with or without the inclusion of an antifungal agent such as nystatin or pimaricin. This reference also discloses that chlortetracycline has been used in feed and can be admixed with *Candida albicans* fermentation product.

U.K. Patent Application 2,106,498 discloses the use of Streptomyces SF-1(ASA), NC1B 11738 to produce a new tetraene and also pimaricin. The activity of the fermentation broth is recorded, but no use of the fermentation biomass is disclosed.

U.S. Pat. No. 4,395,491 discloses the use in fodder of salinomycin in its biomass to promote growth of ruminants and pigs. Similar disclosures are contained in U.S. Pat. No. 4,291,053.

U.S. Pat. No. 3,802,998 relates to a process for producing levorin. The activity of levorin is measured in the fermentation broth, but no specific use is disclosed nor are there any disclosures of using this polyene as a dry biomass. Similarly, levorin and levoristatin activities are measures in the fermentation broth, as disclosed in U.K. Patent 1,254,212.

SUMMARY OF THE INVENTION

The present invention relates to admixing a nonviable, antibiotic-containing biomass with an animal feed. The antibiotic biomass is obtained by drying the biomass of an organism which produces the polyene antibiotic during fermentation.

It is an object of the invention to provide an enhanced animal feed by adding an antibiotic biomass to the feed. The antibiotic biomass enhances the quality and nutritional integrity of the feed by reducing, if not eliminating, contamination of the feed associated with fungal growth and possible mycotoxin release.

DETAILED DESCRIPTION OF THE INVENTION

It has now been found that for many uses, particularly in an animal feed mixture, it may be desirable not to extract and purify the antibiotic from a fermented biomass. More specifically, it has been found that the biomass from an antibiotic fermentation broth is a superior ingredient in animal feeds, particularly grain based feeds, such as poultry feed. Not only does the antibiotic biomass contain biologically effective quantities of an antibiotic to protect against fungal mycotoxin production, but it also contains significant nutrient values such as protein, trace compounds, or the like, which are desirable for maximizing animal growth.

The animal feed compositions of the present invention comprise, by way of example but not limited thereto, an animal feed such as a cracked grain feed for chickens, turkeys, and/or other poultry as well as similar feed for various animals, in combination with a biologically effective amount of an antibiotic, which is included within a nonviable antibiotic biomass.

"Antibiotic biomass" for purposes of this invention is defined as the product of fermenting an organism which releases an antibiotic. The antibiotic biomass is rendered nonviable by any suitable technique, which permits the biomass to be used as an ingredient in animal feed. The biomass comprises at least one of the cells of the antibiotic releasing organism, antibiotic, residual fermentation medium, fermentation broth (e.g., an aqueous phase which typically includes by-products), etc.

"Biologically effective amount" for purposes of this invention means that the nonviable antibiotic biomass is present in a sufficient quantity and will remain effective for a time sufficient to give adequate antifungal control for the animal feed to minimize mycotoxin production. The antifungal control is adequate to protect the animal feed against mycotoxins (e.g., due to growth of fungi, mold, yeast, etc.) contamination over the entire storage period.

"Animal feed" means a foodstuff which includes an antibiotic biomass that is provided to animals including at least one of chickens, horses, poultry, swine, turkeys, ruminants (e.g., bovine), pets, etc. The foodstuff typically comprises at least one of cereal grains (e.g., corn), soybeans, oil seeds, etc., which have been crushed or ground. The antibiotic biomass may be admixed with the foodstuff before, during and/or after being crushed or ground to obtain the animal feed.

"Stored" defines any technique whereby the animal feed is kept in a ready-to-use form for a prolonged period of time, namely about 1 to at least about 2 weeks. Storage may be in elevators, bins, bags, etc. An important aspect of the invention is that the storage is for the purpose of substantially retaining the animal feed in its initial as-stored condition, without significant change or contamination by microorganism attack.

"Dried" means that the nonviable antibiotic biomass, either sun dried or heat dried, has had its initial moisture content of at least about 30% by weight decreased to about 15% or lower, normally about 7%.

The term "non-toxic" embraces the concentration of the nonviable antibiotic biomass and substances used therewith in accordance with the invention for effective biological protection of the animal feed. Non-toxic does not include unacceptable quantities of either toxic chemicals from an antibiotic biomass or mycotoxins from fungal contamination.

The specific antibiotics useful in the antibiotic biomass of the present invention comprise at least one of amphotericin A and B, virginiamycin, leucomycins, levorin, filimarisin, partricin or trichomycin. The antibiotic biomass may include functional equivalent derivatives of the antibiotics that are produced in the fermentation broth. Although, the fermentation process for process for obtaining these antibiotics are known, it was a surprising discovery that the antibiotic biomass without separation of the antibiotic was a superior feed additive.

In one aspect of the invention the antibiotic biomass further comprises mineral inorganic chlorides, sulfates, phosphates and combinations thereof as salts of sodium, potassium, calcium, magnesium, etc. Trace elements such as boron, cobalt, iron, copper, zinc, manganese, chromium, molybdenum and others may also advantageously be present in the antibiotic biomass. Further, the antibiotic biomass may include complex growth factors (e.g., vitamins) and inorganic elements (e.g., potassium, sodium, calcium, etc.).

The animal feed compositions of the present invention are prepared by admixing, blending, etc., a biologically effective amount of the dried antibiotic biomass. For example, the animal feed composition may be prepared by directly admixing the antibiotic biomass into the feed at a concentration effective to achieve about 0.5 to about 100 g, and normally 5 to about 20 g of antibiotic biomass per ton of feed. Since the biomass is typically only 5 to 35% active, i.e., 5-35% polyene antibiotic, up to 2 Kg of biomass per ton of feed may be used. The particular quantity of the antibiotic biomass which is added to the animal feed is dependent upon the environment of the feed. For example, if the environment is favorable for the metabolic activities of the fungi, a relatively large dosage of the antibiotic may be required to be effective against a fungal mycotoxin contamination (e.g., 50 to 80 g of antibiotic biomass per ton of feed). Particularly, an environment which is warm, moist, possesses a neutral pH, contains oxygen, includes a substrate which enhances fungi growth, etc., would require a relatively large dosage of the antibiotic to be effective against a fungal mycotoxin contamination. Further, the amount of the antibiotic biomass which is necessary to prevent contamination is less than the amount of antibiotic biomass which is necessary to treat an existing fungal growth to minimize mycotoxin contamination. Therefore, it is advantageous to add the antibiotic biomass to the animal feed in accordance with the invention, as soon as it becomes practicable.

Moreover, the antibiotic biomass of the invention may further comprise pharmaceutically acceptable derivatives of the antibiotic (e.g., calcium and sodium salts, and esters of antibiotic), which are effective to control and prevent a fungal mycotoxin contamination. The preferred morphology of the antibiotic is crystalline; however, any morphological state is acceptable in practice of the invention which is effective against a fungal mycotoxin contamination. Further, the antibiotic used in the invention may be present in one or more hydrate forms (e.g., mono-, di- and trihydrates). The trihydrate form may be advantageous for some applications due to its stability.

In some aspects of the invention, it may be desirable to increase the effectiveness of the antibiotic biomass by comminuting or grinding the dried antibiotic biomass to increase the surface area of the antibiotic. The comminuted antibiotic biomass is also more readily distributed throughout the animal feed in a uniform manner.

In one aspect of the invention, it is desirable to first prepare a concentrated premix comprising a compatible non-toxic carrier, such as rice hulls, limestone, soybean flour, corn cob fractions, etc., with a relatively large amount of the antibiotic biomass, such as 5-10 g of antibiotic per 2-30 pounds of the non-toxic carrier. The non-toxic carrier may also comprise a liquid such as methanol, water, etc. This premix may then be blended into the final feed, along with other ingredients to achieve the proper concentration of the antibiotic biomass in the final animal feed.

The dried antibiotic biomass of the present invention is desirably introduced into the feed before fungal contamination commences (e.g., mycotoxin release), or at least before the contamination progresses to a degree which is detrimental to the health of an animal consuming the feed. Although the antibiotic within the antibiotic biomass may have some beneficial effect on the animal, the purpose of the present invention is to protect the feed itself from fungal contamination. However, an animal feed containing the antibiotic which is substantially free from fungal contamination, will in turn enhance the animal growth rate in a cost effective manner. For example, the antibiotic biomass (1) enhances the quality of the feed which enhances the health and, thus, growth rate of the animal consuming the feed and (2) permits cost-effective storage of animal feed for a longer period of time without spoilage or waste due to fungal contamination.

The antibiotic biomass of the invention (e.g., amphotericin A and B, virginiamycin, leucomycins, levorin, filimarisin, partricin or trichomycin) is produced by any conventional fermentation process of an organism that produces a desirable antibiotic. During fermentation, the antibiotic producing organism culture is introduced into an aerated nutrient-rich antibiotic production medium. The organisms propagate and produce an antibiotic. Depending on fermentation conditions, antibiotic production rates normally are in the range of about 0.5 through at least about 1.5 g/l antibiotic per liter of production medium.

One specific technique for obtaining a suitable antibiotic biomass comprises preparing and propagating an inoculum comprising an antibiotic releasing species that, during fermentation, produces the desired antibiotic. The antibiotic releasing species is exposed to a series of predetermined environments and/or mediums which may improve the rate at which antibiotic is produced.

During fermentation, the antibiotic may precipitate out as a free crystal, and the same may be bound to the inside and/or on the outside surface of the cells of the organism being fermented. In most fermentations, the antibiotic fraction of total biomass solids will be in the range of about 5 to about 35% antibiotic by dry weight of the resultant antibiotic biomass product.

At the end of the fermentation the biomass, together with the antibiotic, may be physically removed from the fermentation broth. Any solid-liquid separation technique may be used to separate the antibiotic biomass from any liquid present (e.g., filtration, centrifugation, etc.). Alternatively, the fermentation broth may be concentrated by removal of water, such as by evaporation, chemical treatment, etc. The resulting concentrate of antibiotic biomass retains all of the valuable nutrients and other desirable ingredients that might normally have been lost during filtration.

Following concentration, the antibiotic biomass is dried by any suitable technique such as by spray dryer, fluid bed dryer, shelf dryer, etc. The temperature used for drying ranges from about 0° through at least about 120° C. and depends on the drying technique used and the thermal stability of the antibiotic to a given technique.

The antibiotic fermentation, antibiotic biomass recovery and treatment processes generally yield a antibiotic biomass which contains about 5 through at least about 35% antibiotic on a dry weight total antibiotic biomass basis.

For example, the solids from a fermentation broth comprising at lease one of amphotericin A, amphotericin B, levorin, etc., may be separated, for example, by centrifuging. The supernate may be discarded and the biomasses may be divided into particles. The biomasses may be dried in a fluid bed dryer at 70° C. until a moisture content of about 7-8% by weight is obtained. The dried antibiotic biomasses may be mixed with a chicken feed comprising corn, wheat and soybean meal at a rate of about 100 grams of biomass per ton of chicken feed. Alternatively, a feed premix may be prepared by mixing about 100 grams of the antibiotic biomasses with about 1-5 pounds of rice hulls and/or soybean flour. The premixes may be admixed with a chicken feed comprising corn, wheat and soybean meal to obtain an enhanced feed including typically about 10 through 15 grams of antibiotic per ton of feed. The resultant feed is (1) protected from fungi contamination, (2) permits enhanced chicken growth rates and (3) controls and prevents diseases in the chicken associated with a fungi infection or mycotoxin production.

While not wishing to be bound by any theory or explanation, it is believed that the antibiotic biomass is active or effective against growth of fungi, mold and yeast, but not against bacteria. One explanation may be that fungi (but not bacteria) contain ergosterol in their membranes.

In general, the fungi will grow, if the environment is appropriate, until contacting the antibiotic within the antibiotic biomass. The mechanism of antibiotic action suggested is a binding of the antibiotic molecule and ergosterol present in the cell membrane of the fungi. The binding or complexing with ergosterol is substantiated by the neutralizing effects of ergosterol addition on the antifungal activities of the antibiotic against fungi. A complex between the antibiotic and the cell membrane of the fungi is believed to alter membrane permeability since the antibiotic typically is a relatively large molecule which creates an increased surface pressure which may tend to induce a reorientation of the ergosterol present in the membrane; thus altering permeability of the cell and resulting in osmotic shock. This osmotic shock is sufficient to interrupt, if not halt, the metabolic activities of the fungi (e.g., the antibiotic may cause irregular fungi growth, sporulation, discoloration, etc.), and therefore, reduce mycotoxin contamination.

Moreover, in one aspect of the invention, an energy source such as sugar (e.g., lactose) may already be present and/or admixed with the antibiotic biomass which is added to the animal feed. Particularly, without wishing to be bound by any theory or discussion, it is believed that the energy source may enhance the mechanism, discussed above, through which the antibiotic is believed to be effective against the fungi.

In addition to the energy source, other materials may be used in conjunction with the antibiotic biomass. Particularly, there are certain readily available materials which may tend to reduce growth of the undesired fungi. For example, fish meal, certain vitamins, etc., may be added to the feed which is consumed by the animals that may adversely affect the environment of the undesired fungi (e.g., the growth rate of the fungi is reduced). However, the presence of, for example, fish meal alone is not sufficient to protect animal feed from fungi contamination. Therefore, in certain aspects of the invention, a combination of the antibiotic biomass with other materials is effective against fungal contamination.

The antibiotic biomass is also compatible with other additives which may be admixed with the animal feed. Suitable additives include the members from the following group: protein, fat, fiber, calcium (e.g., calcium carbonate), phosphorus, trace metals, vitamins, citrus pulp, grape hulls, rice hulls, or the like.

The antibiotic biomass which has been added to the animal feed possesses an acceptable shelf life. Depending upon the storage conditions, the antibiotic can be expected to be effective against fungal contamination of the animal feed for several weeks or months. However, to ensure maximum effectiveness of the antibiotic biomass within the animal feed, the feed should be shielded from extended exposure to light (e.g., feed should be stored in the dark within a dry container).

Any antibiotic within the antibiotic biomass which is consumed by the animal is normally not absorbed or retained within the animal. As a result, the antibiotic is generally not incorporated into the eggs and/or flesh of the animal and, accordingly, if desired, does not affect human consumption of any animal which has consumed the feed of the invention. However, animals which are exposed to the fungi may incorporate the fungi, and in some cases toxins thereof, into their eggs and flesh. These fungi may be harmful to humans which consume the eggs and/or flesh of contaminated animals and, accordingly, it is desirable to prevent any significant exposure of such animals to fungi. Therefore, one aspect of the present invention permits enhanced production of animals which are not contaminated with undesirable fungi.

In certain aspects of the invention, it may be advantageous to introduce the antibiotic biomass in the animal feed in conjunction with other treatment processes and/or substances. More importantly, the antibiotic biomass of the invention does not preclude using the animal feed in conjunction with any medication, end use product or event (e.g., the antibiotic biomass may be fed to an animal undergoing a certain medical treatment).

Having thus described and exemplified the invention with a certain degree of particularity, it should be appreciated that the following claims are not to be so limited but are to be afforded a scope commensurate with the wording of each element of the claim and equivalents thereof.

What is claimed:

1. An animal feed additive composition consisting essentially of (a) a dried antibiotic biomass containing at least one polyene antibiotic selected from the group consisting of amphotericin A and B, virginiamycin, leucomycin, levorin, filimarisin, partricin, and trichomycin in admixture with (b) a non-toxic carrier material, the weight ratio of antibiotic to carrier in the admixture being from 0.167 to 5, wherein said dried biomass prevents fungal attack of feed during storage.

2. The composition of claim 1 containing 5 to 35 parts by weight of antibiotic per 100 parts by weight residual biomass solids.

3. The composition of claim 1 mixed with animal feed to contain about 0.5 g to 100 g antibiotic per ton of animal feed.

4. The composition of claim 3 wherein the animal feed is grain-based poultry feed.

5. An animal feed composition consisting essentially of (a) a dried antibiotic biomass containing at least one polyene antibiotic selected from the group consisting of amphotericin A and B, virginiamycin, leucomycin, levorin, filimarisin, partricin, and trichomycin unseparated from the residual biomass solids from fermentation of the antibiotic-producing organism in admixture with (b) an animal foodstuff, the amount of antibiotic in the admixture being sufficient to reduce contamination of the foodstuff with fungal growth and mycotoxin during storage.

6. The composition of claim 5 containing from 5 to 35 parts by weight of antibiotic per 100 parts by weight residual fermentation solids.

7. The composition of claim 5 containing about 0.5 g to 100 g antibiotic per ton of animal feed.

8. The composition of claim 7 wherein the animal feed comprises cracked grain-based poultry feed.

9. The method of preparing an animal feed consisting essentially of: preparing at least one polyene antibiotic selected from the group consisting of amphotericin A and B, virginiamycin, leucomycins, levorin, filimarisin, patricin and trichomycin in a fermentation broth containing fermentation medium and organisms capable of producing said antibiotic; separating from the fermentation broth said antibiotic and other biomass solids including organisms; drying said antibiotic and biomass solids; and adding the dried antibiotic and biomass solids to an animal feed, the amount of antibiotic in the admixture being sufficient to reduce contamination of the foodstuff with fungal growth and mycotoxin during storage.

* * * * *